Figure 1:
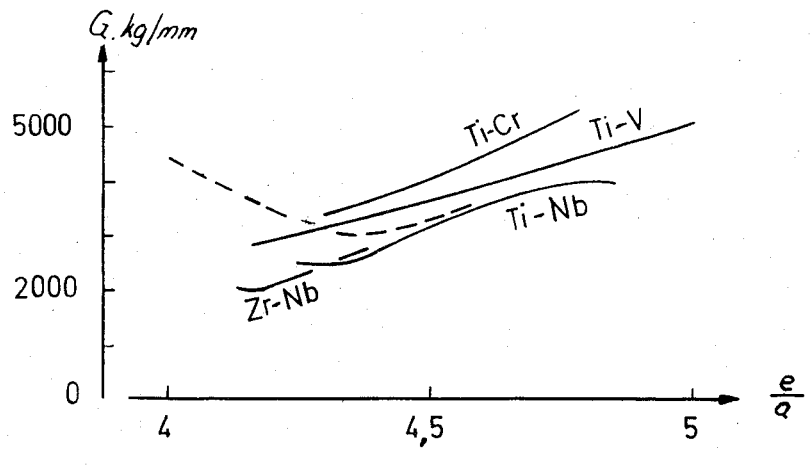

United States Patent [19]
Steinemann

[11] 3,777,346
[45] Dec. 11, 1973

[54] TENSION BAND
[75] Inventor: Samuel G. Steinemann, Liestal, Switzerland
[73] Assignee: Institut Dr. Ing. Reinhard Straumann AG, Waldenburg, Switzerland
[22] Filed: July 7, 1971
[21] Appl. No.: 160,465

[30] Foreign Application Priority Data
July 17, 1970 Switzerland.................. 10878/70

[52] U.S. Cl.................... 29/180, 73/432, 75/134, 75/174, 75/175.5, 75/177, 324/158
[51] Int. Cl............................................ C22c 27/00
[58] Field of Search ............... 148/32, 134; 75/174, 75/175.5, 176, 177; 73/432; 324/158; 29/180

[56] References Cited
FOREIGN PATENTS OR APPLICATIONS
1,183,476   3/1970   Great Britain.................... 148/13 R Primary Examiner—Charles N. Lovell
Attorney—David Toren et al.

[57] ABSTRACT
A tension band for suspending a rotatable measuring mechanism is composed of a metal alloy in which the ratio of the number of free electrons to the number of atoms is between about 4.15 to 4.5.

11 Claims, 2 Drawing Figures

TENSION BAND

BACKGROUND INFORMATION AND PRIOR ART

Rotatable measuring mechanisms of measuring instruments are customarily mounted on pivots or are suspended by means of straps or tension bands (hereinafter referred to as "tension bands"). Such measuring instruments are, for example, devices for measuring electrical quantities or values, but scales, gyros and the like are also embraced thereby.

Suspension by tension bands is preferred because it results in high precision, satisfactory position independency and insensitivity to impact forces on the instrument.

With a view to achieving a satisfactory suspension by tension bands, a number of requirements has to be fulfilled by the materials from which the tension bands are made. These requirements may be summarized as follows:

a. The material must have a low shear modulus so that the measuring mechanism can operate with small torque;
b. the material must have mechanical strength so that the suspension can be operated under tension which, in turn, assures insensitivity in respect to inclined positions of the instrument and in respect to vibration and impacts;
c. The material should have a high degree of corrosion resistance;
d. The elastic after-effects (non-reversibility of torque) should be as small as possible and the torsional moment should be largely independent from temperature fluctuations;
e. In order to produce the bands in an economical manner, the material should have good formability.

The two most important requirements are those listed under a) and b) above and may be expressed by way of a quality factor Q: The torque necessary to twist a rod is proportional to the shear modulus G and to a geometrical form factor; the form factor, in turn, is proportional to the square of the cross-section of the rod. The linear relation between the torque M and the twisting $\alpha$ of a rod may be expressed as follows:

$$M = (G\, k^2\, F/l)\, \alpha$$

wherein G = shear modulus of the material
$\alpha$ = angle of rotation
$l$ = the length of the rod
$k$ = geometrical form factor which, for example, for a circular cross-section amounts to $(2l/2\pi)$
F = cross sectional area The tension in the band is not permitted to exceed the elastic limit $\sigma_E$ of the metal. This means that the maximum force which can be applied for longitudinal tension is $P_{max} = F \cdot \sigma_E$. If the cross sectional area F in the above formula is replaced by $P_{max}/\sigma_E$, and the formula is thus written and arranged as follows:

$$M/P_{max}^2 = (\alpha \cdot K)/l \cdot 1/Q$$

$$Q = \sigma_E^2/G$$

it will be apparent that the two conditions a) and b) above are interrelated and that not the absolute values of $\sigma_E$ and G are decisive, but rather the ratio $\sigma_E^2/G$.

A number of metals have been proposed for use in tension bands of the indicated kind. The most common metals presently employed for this purpose are alloys of copper-beryllium, bronze, gold, platinum - nickel alloys and cobalt-base-alloys. These metals are imparted with considerable mechanical strength by cold working and heat treatment. For these materials the following values for Q are obtained:

TABLE 1

| Alloy | $\sigma_E$ kg/mm² | G kg/mm² | Q kg/mm² |
|---|---|---|---|
| Cu-2Be | 100 | 7000 | 1.4 |
| Pt-Ir 70/30 | 110 | 10200 | 1.2 |
| Pt-Ni 90/10 | 120 | 7850 | 1.8 |
| Cobalt Alloy | 170 | 9000 | 3.2 |

SUMMARY OF THE INVENTION

It is a primary object of the invention to provide tension bands for the indicated purpose which have high mechanical strength and low torque and further meet requirements of corrosion resistance and vanishing elastic after-effects.

It is a further object of the invention to provide such tension bands which can be manufactured in a simple and relatively inexpensive manner.

Generally, it is an object of the invention to improve on the art of suspending rotatable mechanisms of measuring instruments.

Briefly, and in accordance with the invention it has been found that the above objects are superiorly obtained if the tension bands are composed of an alloy in which the ratio $e/a$ of the number of free electrons to the number of atoms is between 4.15 and 4.5.

Particularly suitable for the inventive purpose are alloys on the basis of titanium, zirconium and hafnium, to wit, the transition elements of Group IV of the periodic system. The suitability of titanium, zirconium and hafnium alloys for tension bands appears from the following embodiments. The inventive tension bands are corrosion-resistant and do not exhibit any elastic after-effects. Furthermore, the shear modulus has an insignificant temperature dependency.

The alloys used for the inventive tension bands may also contain up to 15 atomic percent of non-transition metals, to wit, for example, up to 15 atomic percent of Al, Sn, In, Ga or Cu. (Unless indicated otherwise "%" refers to percent by weight)

TABLE 2

| Alloy | e/a | $\sigma_E$ | G | Q |
|---|---|---|---|---|
| 13%V, 11%Cr, 3%Al, remainder Ti | 4.27 | 120 | 3500 | 4.1 |
| 30% Nb, remainder Zr | 4.3 | 120 | 2800 | 5.2 |
| 30% V, remainder Ti | 4.3 | 100 | 3000 | 3.3 |
| 50% V, remainder Ti | 4.5 | 100 | 3200 | 3.1 |
| 17% Cr, remainder Ti | 4.3 | 110 | 3000 | 4.0 |
| 40% Nb, remainder Ti | 4.26 | 100 | 2900 | 3.5 |
| 17% Nb, remainder Hf | 4.28 | 110 | 3500 | 3.5 |
| 15% Mo, remainder Ti | 4.26 | 110 | 3400 | 3.6 |
| 11% Mn, 6% Sn, rem.Ti | 4.30 | 110 | 3700 | 3.3 |

The mechanical strength, i.e. the elastic limit of the inventive tension bands is substantially similar to that of prior art tension bands. However, the shear modulus of the inventive tension bands is significantly smaller. In this manner, the quality factor of the inventive bands, as compared to the prior art bands made from materials listed in Table 1, is significantly increased. The known materials from which tension bands hitherto have been made, have a face-centered cubic crystal structure, while the materials for the inventive tension bands are body-centered cubic. In addition, of course, the electron concentrations are totally different.

The desired values as listed in Table 2 can be obtained, for example, in the following manner:

A. With a commercially available β-titanium alloy consisting of 13 percent of vanadium, 11 percent of chromium, 3 percent of aluminum, the remainder being titanium (atomic percentages are 12 for V, 10 for Cr, 5 for Al): By solution annealing, quenching, cold-working and tempering at 500°C, highest mechanical strength properties are obtained. Cold work and the partial phase decomposition (β· into β + α ), combined together are essential B. With an alloy consisting of 30 percent of niobium and the remainder zirconium: By cold working of the annealed and quenched metal and precipitation hardening, at temperatures of 500°–700°C. The annealed and rapidly cooled metal has a single phase but is in unstable condition, and the precipitation hardening causes structural decomposition. The obtainable strength however, also depends on the presence of dissolved gases, to wit, $O_2$, $N_2$, C and the like, the so-called interstitial atoms with an atomic number smaller than 9, which cause dispersion hardening. The amount of interstitial atoms may rise up to 2000 ppm.

C. With titanium-vanadium alloys which are forgeable in the entire β- range and which are ductile for cold-working. The alloy consisting of 70 percent titanium and 30 percent of vanadium is annealed at about 900°C, quenched and then cold-worked. By precipitation hardening at 450°C, which results in a partial phase transition, the elasticity limit of 80 kg/mm² can be increased to about 100 kg/mm². In the annealed metal $\sigma_E$ is about 40 kg/mm². TiCr alloys have similar properties and are treated by the same manufacturing steps.

The cold-work is conducted so as to obtain the shape of the band. Commonly it consists of drawing and flattening the wire by rolling.

The above examples are concerned with so-called β-alloys. The annealed metal or at least the quenched metal is present in the body-centered cubic phase and the composition of the alloy is near the limit of the stability range of this β-phase. At lower electron per atom ratios the hexagonal α-phase is the stable phase.

The shear modulus of a cubic single crystal is direction-dependent and may be expressed with the independent shears $CP = \frac{1}{2}(C_{11}-C_{12})$ and $CS = C_{44}$ by the formula:

$$1/G = 1/CS + 2[1/CP - 1/CS]\Phi$$

wherein Φ is the product sum of the direction cosini $$\Phi = l^2 m^2 + d^2 n^2 + m^2 n^2$$

and indicates the position of the torsion axis relative to the axes of the single crystal. In polycrsytalline metals, Φ has the signification that it is the mean value of the orientations of the individual grains. It is in particular for isotropic structures Φ = 0.2. If CP<CS, then G<CS.

Measurements are known which indicate that for vanadium CP>CS. However, for example, in titanium-rich TiCr-alloys, CP<CS. This is one condition which imparts low values to G in polycrystalline metals. Furthermore CS should not be too large and this is especially the case for Zr-Nb, Ti-Nb, Ti-Cr alloys, and in general both conditions are met with alloys based on transition elements at the beginning of this series of the periodic system.

As a general proposition it may be stated that the tension band may be formed from the metal alloys in which the ratio of the number of free electrons to the number of atoms is between about 4.15 to 4.5, by first annealing the alloy at a temperature above 800°C, then shaping the alloy into the desired form by cold-working and finally subjecting the shaped metal to a heat treatment at a temperature range of about 300°–900°C.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described the preferred embodiment of the invention.

IN THE DRAWING

Figure 2:
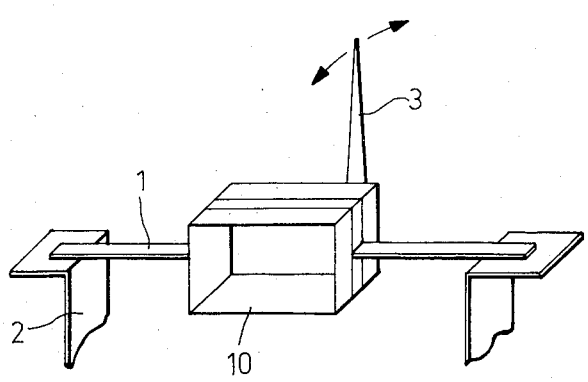

FIG. 1 represents examples of the polycrystalline alloys TiV, TiCr, TiNb and ZrNb while FIG. 2 is a diagrammatic view of a tension band employed for suspending a rotatable instrument:

Turning now to FIG. 1, all these alloys have a similar behavior and, for an electron per atom ratio, e/a, of 4, is to 4.5, exhibit particularly low shear moduli. The ratio e/a is equal to $1/100\Sigma_i v_i c_i$ and is formed by the sum of the products obtained by multiplying the number of outer electrons ($v_1$= the group in the periodic system) with the concentration, in atomic percent $c_i$ for each component $i$. This behavior of the shear modulus is physically to be interpreted as contribution of the itinerant electrons, to wit, of all the electrons outside closed shells which, with their kinetic and electrostatic energy contribute to cohesion of the metallic crystal. It has surprisingly been found that metals of the third, fourth and fifth period and alloys of these metals have similar characteristics which can be exactly indicated by the ratio e/a. Alloys on the basis of titanium with vanadium, chromium, manganese, iron, cobalt, nickel or niobium, molybdenum or tantalum and tungsten (elements which also are referred to as β-formers) yielded in experiments the low shear moduli, if their concentration is adjusted corresponding to their valence. This apparently is interrelated with the mechanical stability of the body centered cubic β-phase i.e., a fundamental physical property. This is the reason why the alloys for the tension bands of the invention are defined not by their strength or their specific weight or their shear modulus or their chemistry, but rather by their ratio e/a.

The high elastic limit which, according to the formula, comes in with its square value in the quality factor, can be obtained by cold-working, which in respect to the production of tension bands is from a practical point of view always usable. High strength may also be obtained by precipitation hardening, by dispersion hardening — from the reaction with dissolved gases, so called interstitial atoms — and particularly by phase transformation caused by heat treatments. The last mentioned procedure is applicable for the examples of the Ti, 13V 11Cr 3Al, the TiNb -, the TiCr - and Zr 30Nb-alloys. The first two alloy series are unstable after annealing and quenching for e/a values of 4.15 to 4.4 and decompose upon precipitation aging into α + β phases and the latter two systems remain single phase β only in the quenched state for all alloys. The cold-working accelerates the decomposition. For zirconium alloys the mixability is generally very limited, but rapid cooling prevents the transformation.

According to the diagrammatic showing of FIG. 2, the armature 10 of a measuring instrument having a rotatable measuring mechanism is suspended by an inventive tension band 1. The tension band, in turn, is secured to supports 2. The measured value is indicated by an indicator 3 on a scale (not shown).

What is claimed is:

1. A measuring instrument comprising in combination a rotatable measuring mechanism suspended by tension band, said tension band being characterized in that it is composed of a metal alloy in which the ratio of the number of free electrons to the number of atoms is between 4.15 to 4.5;

wherein the main component of the alloy consists of an element from the group consisting of Ti, Zr and Hf.

2. The combination as claimed in claim 1, wherein the alloy contains an amount of non-transition metals, said amount not exceeding 15 atomic percent.

3. The combination as claimed in claim 1, wherein the alloy contains an amount of elements whose atomic number is smaller than 9, said amount not exceeding 2 atomic percent.

4. The combination as claimed in claim 1, wherein the alloy essentially consists of 13 percent of vanadium, 11 percent of chromium, 3 percent of aluminum, the remainder being titanium.

5. The combination as claimed in claim 1, wherein the alloy essentially consists of 20 to 40 atomic percent of niobium, the remainder being zirconium.

6. The combination as claimed in claim 1, wherein the alloy essentially consists of 20 to 40 atomic percent of vanadium, the remainder being titanium.

7. The combination as claimed in claim 1, wherein the alloy essentially consists of 8 to 20 atomic percent of chromium, the remainder being titanium.

8. The combination as claimed in claim 1, wherein the alloy essentially consists of about 17 percent of niobium, the remainder being hafnium.

9. The combination as claimed in claim 1, wherein the sum of the components titanium plus zirconium plus hafnium of the alloy is at least 50 atomic percents.

10. The combination of claim 2, wherein said non-transition metals are Al, Sn, In, Ga or Cu.

11. The combination of claim 3, wherein said elements are oxygen, nitrogen or carbon.

* * * * *